(12) United States Patent
Parhi et al.

(10) Patent No.: US 7,769,099 B2
(45) Date of Patent: *Aug. 3, 2010

(54) HIGH-SPEED PRECODERS FOR COMMUNICATION SYSTEMS

(75) Inventors: Keshab K. Parhi, Maple Grove, MN (US); Yongru Gu, Sacramento, CA (US)

(73) Assignee: Leanics Corporation, Maple Grove, MN (US)

( * ) Notice: Subject to any disclaimer, the term of this patent is extended or adjusted under 35 U.S.C. 154(b) by 1267 days.

This patent is subject to a terminal disclaimer.

(21) Appl. No.: 11/225,383

(22) Filed: Sep. 13, 2005

(65) Prior Publication Data

US 2006/0056521 A1 Mar. 16, 2006

Related U.S. Application Data

(60) Provisional application No. 60/609,289, filed on Sep. 13, 2004, provisional application No. 60/715,672, filed on Sep. 9, 2005.

(51) Int. Cl.
*H04B 15/00* (2006.01)

(52) U.S. Cl. .................. 375/285; 375/229; 375/243; 708/233; 708/300; 708/406; 708/508; 708/521; 708/631

(58) Field of Classification Search .............. 375/285, 375/316; 398/135; 702/322
See application file for complete search history.

(56) References Cited

U.S. PATENT DOCUMENTS 5,745,396 A * 4/1998 Shanbhag .............. 708/322
2001/0035994 A1* 11/2001 Agazzi et al. .............. 359/152
2002/0122503 A1* 9/2002 Agazzi .................. 375/316
2007/0014345 A1 1/2007 Gu et al.
2007/0014380 A1 1/2007 Gu

OTHER PUBLICATIONS

Harashima, Hiroshi et al., "Matched-Transmission Technique For Channels With Intersymbol Interference", IEEE Transactions on Communications, vol. Com-20, No. 4, (Aug. 1972), pp. 774-780.
Parhi, Keshab K., et al., "Pipeline Interleaving and Parallelism in Recursive Digital Filters—Part I: Pipelining Using Scattered Look-Ahead and Decomposition", IEEE Transactions on Acoustics, Speech, And Signal Processing, vol. 37, No. 7, (Jul. 1989), pp. 1099-1117.
Parhi, Keshab K., "Pipelining in Algorithms with Quantizer Loops", IEEE Transactions on Circuits And Systems, vol. 38, No. 7, (Jul. 1991),pp. 745-754.
Wesel, Richard D., et al., "Achievable Rates for Tomlinson-Harashima Precoding", IEEE Transactions on Information Theory, vol. 44, No. 2, (Mar. 1998), pp. 824-831.
Gu, Yongru et al., "Pipelining Tomlinson-Harashima Precoders", IEEE ISCAS Symp., Kobe, Japan, May 23-26, 2005, pp. 4.

* cited by examiner

*Primary Examiner*—David C Payne
*Assistant Examiner*—Adolf Dsouza
(74) *Attorney, Agent, or Firm*—Patrick Garrett

(57) ABSTRACT

The invention relates to techniques for implementing high-speed precoders, such as Tomlinson-Harashima (TH) precoders. In one aspect of the invention, look-ahead techniques are utilized to pipeline a TH precoder, resulting in a high-speed TH precoder. These techniques may be applied to pipeline various types of TH precoders, such as Finite Impulse Response (FIR) precoders and Infinite Impulse Response (IIR) precoders. In another aspect of the invention, parallel processing multiple non-pipelined TH precoders results in a high-speed parallel TH precoder design. Utilization of high-speed TH precoders may enable network providers to for example, operate 10 Gigabit Ethernet with copper cable rather than fiber optic cable.

13 Claims, 16 Drawing Sheets

- Prior Art -

HIGH-SPEED PRECODERS FOR COMMUNICATION SYSTEMS

This application claims the benefit of U.S. Provisional Application No. 60/609,289 to Parhi et al., entitled "PIPELINED AND PARALLEL TOMLINSON-HARASHIMA PRECODERS," filed Sep. 13, 2004, and U.S. Provisional Application No. 60/715,672, to Parhi et al., entitled "PIPELINED AND PARALLEL TOMLINSON-HARASHIMA PRECODERS," filed Sep. 9, 2005, the entire contents of each being incorporated herein by reference.

STATEMENT REGARDING FEDERALLY SPONSORED RESEARCH FOR DEVELOPMENT

The invention was made with Government support from the National Science Foundation No.CCF-0429979. The Government may have certain rights in this invention.

TECHNICAL FIELD

The invention relates to computer networks and, more specifically, to precoding data for transmission across computer networks.

BACKGROUND

Tomlinson-Harashima Precoding (THP) was invented by Tomlinson and Harashima for channel equalization, and has been widely used in DSL systems, voice band and cable modems. Unlike decision feedback equalization where channel equalization takes place at the receive side, THP is a transmitter technique where equalization is performed at the transmitter side. It may eliminate error propagation and allow the use of current capacity-achieving channel codes, such as low-density parity-check (LDPC) codes in a natural way.

THP converts an inter-symbol interference (ISI) channel to a near additive white gaussian noise (AWGN) channel and allows the system to take full advantage of current capacity-achieving error correction codes. Like decision feedback equalizers, Tomlinson-Harashima (TH) precoders contain nonlinear feedback loops, which limit their use for high speed applications. The speed of TH precoders is limited by the sum of the computation times of two additions and one multiplication. Unlike decision feedback equalization where the output levels of the nonlinear devices (quantizers) are finite, in TH precoders the output levels of the modulo devices are infinite, or finite but very large. Thus, it is difficult to apply look-ahead and pre-computation techniques to pipeline TH precoders, which were successfully applied to pipeline Decision Feedback Equalizers (DFEs) in the past.

Recently, TH precoding has been proposed to be used in 10 Gigabit Ethernet over copper. The symbol rate of 10GBASE-T is expected to be around 800 Mega Baud. However, TH precoders contain feedback loops, so it is hard to clock them at such high speed. Thus, the high speed design of TH precoders is of great interest.

SUMMARY

In general, the invention relates to techniques for implementing high-speed precoders, such as Tomlinson-Harashima (TH) precoders. In one aspect of the invention, look-ahead techniques are utilized to pipeline a TH precoder, resulting in a high-speed TH precoder. These techniques may be applied to pipeline various types of TH precoders, such as Finite Impulse Response (FIR) precoders and Infinite Impulse Response (IIR) precoders. In another aspect of the invention, parallel processing multiple non-pipelined TH precoders results in a high-speed parallel TH precoder design. Utilization of high-speed TH precoders may enable network providers to for example, operate 10 Gigabit Ethernet with copper cable rather than fiber optic cable.

In one embodiment, a precoder comprises a plurality of pipelined computation units to produce a precoded symbol, wherein one of the computation units performs a modulo operation and feeds back a compensation signal for use as an input to the modulo operation for precoding a subsequent symbol.

In another embodiment, a method comprises performing a modulo operation within one of a plurality of pipelined computational units of a pipelined precoder to produce a precoded symbol, wherein the modulo operation feeds back a compensation signal for use as an input to the modulo operation for precoding a subsequent symbol, and sending a network communication in accordance with the precoded symbol.

In another embodiment, a parallel precoder comprises a plurality of computation units to output signals for at least two precoded symbols in parallel, wherein the computation units includes a first modulo operation unit and a second first modulo operation unit, and wherein the first one of the modulo operation units performs a modulo operation for precoding a first one of the symbols and forwards a compensation signal to the second modulo operation unit for use as an input to a modulo operation for precoding a second one of the symbols.

In another embodiment, a method comprises performing, in parallel, at least two modulo operations for outputting at least two precoded symbols, wherein at least one of the modulo operations produces a compensation signal for use in precoding a subsequent symbol, and outputting a network communication in accordance with the precoded symbols.

In another embodiment, a transceiver for network communications, wherein the transceiver comprises a parallel Tomlinson-Harashima precoder that performs at least two modulo operations in parallel for outputting at least two precoded symbols.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
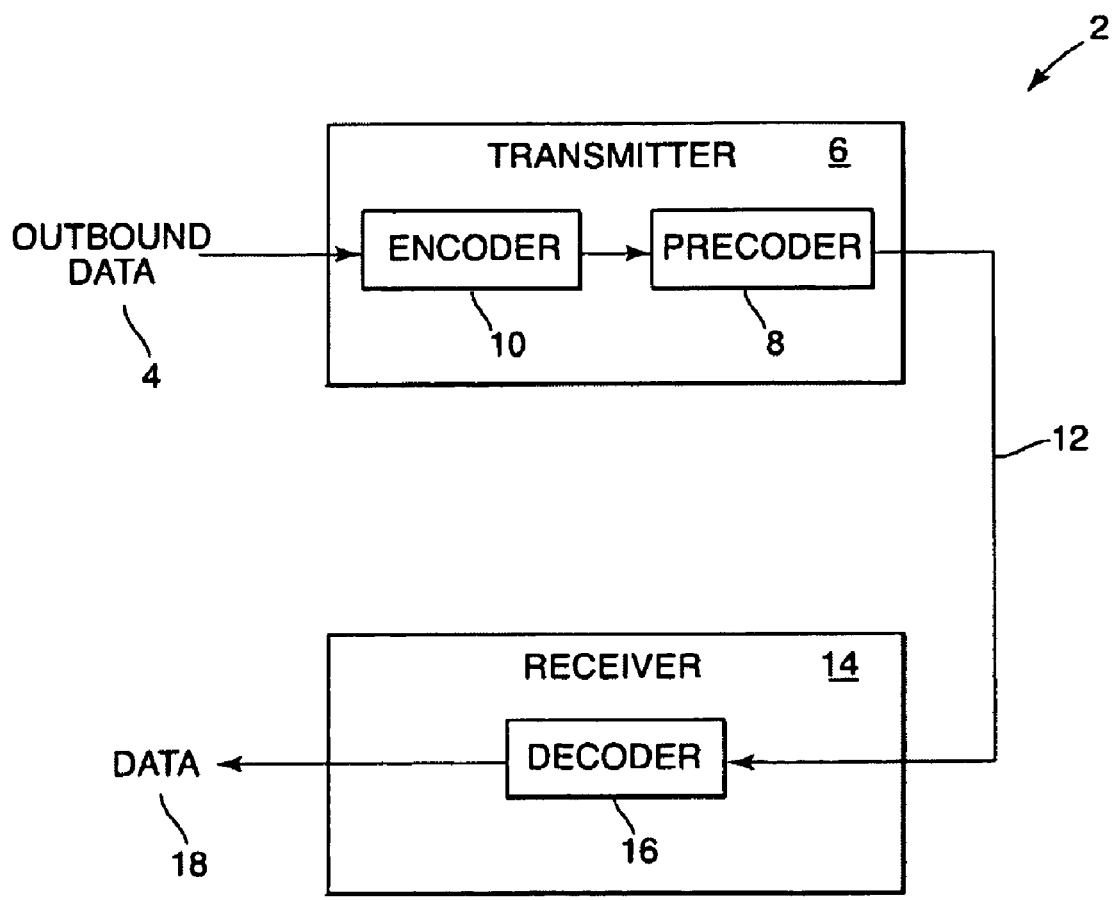
FIG. 1 is a block diagram illustrating an exemplary network communication system.

FIG. 1 is a block diagram of an exemplary network communication system 2. For purposes of the present description, communication system 2 will be assumed to be a 10 Gigabit Ethernet over copper network. Although the system will be described with respect to 10 Gigabit Ethernet over copper, it shall be understood that the present invention is not limited in this respect, and that the techniques described herein are not dependent upon the properties of the network. For example, communication system 2 could also be implemented within networks of various configurations utilizing one of many protocols without departing from the scope of the present invention.

In the example of FIG. 1, communication system 2 includes transmitter 6 and receiver 14. Transmitter 6 comprises encoder 10 and precoder 8, which encode and precode outbound data, 4 respectively, for transmission via network connection 12. Outbound data 4 may take the form of a stream of symbols for transmission to receiver 4. Once receiver 14 receives the encoded data, decoder 16 decodes the data resulting in decoded data 18, which may represent a stream of estimated symbols. In some cases decoded data 18 may then be utilized by applications within a network device that includes receiver 14.

In one embodiment, transmitter 6, located within a first network device (not shown), may transmit data to receiver 14, which may be located within a second network device (not shown). The first network device may also include a receiver substantially similar to receiver 14. The second network device may also include a transmitter substantially similar to transmitter 6. In this way, the first and second network devices may achieve two way communication with each other or other network devices. Examples of network devices that may incorporate transmitter 6 or receiver 14 include desktop computers, laptop computers, network enabled personal digital assistants (PDAs), digital televisions, or network appliances generally.

Precoder 8 may be a high-speed precoder, such as a pipelined Tomlinson-Harashima (TH) precoder or a parallel TH precoder. Utilization of high-speed TH precoders may enable network providers to operate 10 Gigabit Ethernet with copper cable. For example, network providers may operate existing copper cable networks at higher speeds without having to incur the expense of converting copper cables to more expensive media, such as fiber optic cables. Furthermore, in certain embodiments of the invention, the high-speed TH precoder design may reduce hardware overhead of the precoder. Although the invention will be described with respect to TH precoders, it shall be understood that the present invention is not limited in this respect, and that the techniques described herein may apply to other types of precoders.

Figure 2A:
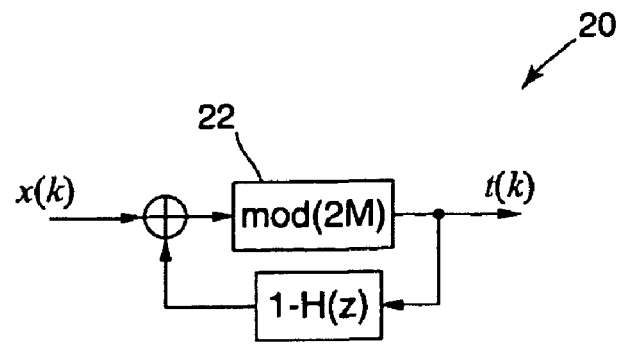
FIGS. 2A-2F are block diagrams illustrating an exemplary process of pipelining a finite impulse response (FIR) TH precoder.

FIGS. 2A-2F are block diagrams illustrating an exemplary process of pipelining a finite impulse response (FIR) TH precoder. FIG. 2A is a block diagram of FIR TH precoder 20.

FIR TH precoder 20 comprises a nonlinear modulo device 22 in the feedforward path of the pre-equalizer to limit the output dynamic range.

Figure 2B:
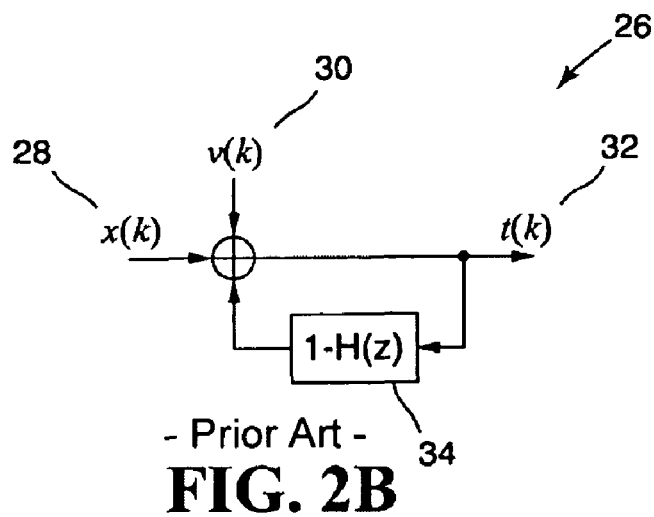

FIG. 2B is a block diagram of an equivalent form precoder 26, which is an equivalent form of FIR TH precoder 20 expressed as an infinite impulse response (IRR) filter. Modulo device 22 (FIG. 2A) is removed from equivalent form precoder 26 illustrated in FIG. 2B. Furthermore, a unique compensation signal v(k) 30 of multiple 2M is added to the transmitted pulse amplitude modulated (PAM) signal x(k) 28 such that the output of the precoder t(k) 32 is limited in the interval [−M,M]. Thus, an effective transmitted data sequence in the z-domain is:

$$t(z) = \frac{x(z) + v(z)}{H(z)}. \tag{1}$$

As described herein, the next step of the pipelining process is to replace IIR filter $$\frac{1}{H(z)} 34$$

(FIG. 2B) with a pipelined version. There are many ways to pipeline the IIR filter $$\frac{1}{H(z)}.$$

For example, either a clustered look-ahead approach or a scattered look-ahead approach may be utilized. In both of the approaches, the pipelined filter $H_p(z)$ is obtained by multiplying an appropriate polynomial $$N(z) = 1 + \sum_{i=1}^{L_N} n_i z^{-i}$$

to both the numerator and the denominator of the transfer function of the original IIR filter:

$$H_p(z) = \frac{N(z)}{H(z)N(z)} = \frac{N(z)}{D(z)} \tag{2}$$

The pipelined filter $H_p(z)$ consists of two parts, a FIR filter N(z) and an all-pole pipelined IIR filter $$\frac{1}{D(z)}.$$

In the case of the clustered look-ahead approach, D(z) may be expressed in the form of $$D(z) = 1 + z^{-K} \sum_{i=0}^{K+L_H} d_i z^{-i} \quad (3)$$

and, for the scattered look-ahead approach D(z) may be represented as $$D(z) = 1 + \sum_{i=1}^{L_H} d_i z^{-iK} \quad (4)$$

where K is the pipelining level.

Figure 2C:
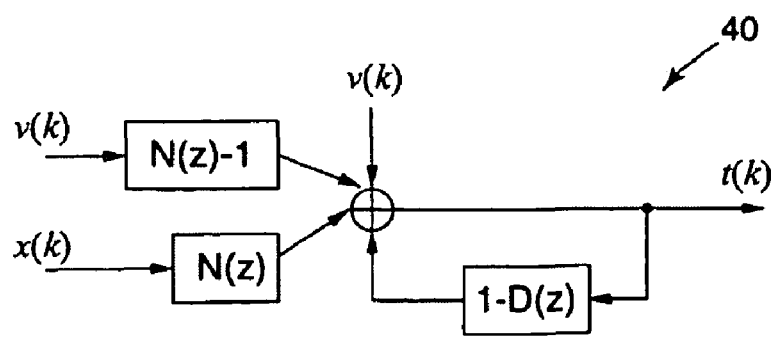

FIG. 2C is a block diagram of an exemplary pipelined equivalent form 40. IIR filter $$\frac{1}{H(z)} 34$$

(FIG. 2B) is replaced with pipelined version $\{Beth-1/H_p(z)\}$ as described in equation (2), resulting in a design illustrated in FIG. 2C.

Figure 2D:
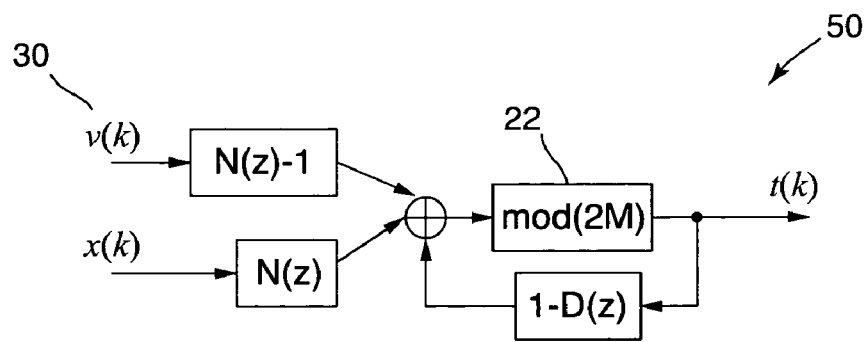

FIG. 2D is a block diagram of an exemplary FIR TH precoder architecture 50. The design of FIR TH precoder architecture 50 was generated from pipelined equivalent form 40 (FIG. 2C) with nonlinear modulo device 22 (first introduced in FIG. 2A) returned to the feedforward path, which removes input v(k) 30 from all-pole IIR filter $$\frac{1}{D(z)} 52.$$

Figure 2E:
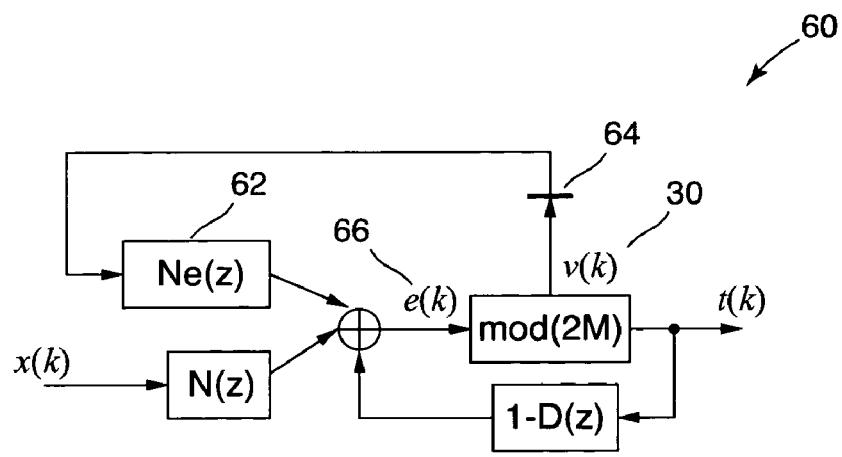

FIG. 2E is a block diagram of another exemplary FIR TH precoder architecture 60, distinguished from architecture 50 of FIG. 2D by sending a delayed version of compensation signal v(k) 30 to the input of FIR filter $N_e(z)$ 62. Signal v(k) 30 is delayed by delay element 64 illustrated in FIG. 2E. Delay element 64 may be any type of electronic delaying device.

In order to implement the pipelined design process illustrated in FIGS. 2A-2F, the modifications need to maintain the functionality of a straightforward TH precoder. The term "straightforward" refers to a non-pipelined TH precoder and will be used throughout this detailed description. The design of FIR TH precoder architecture 60 maintains the functionality of a straightforward (non-pipelined) TH precoder as is described by the following equations 5-12. First, $N_e(z)$ 62 (FIG. 2E) is defined as $$N_e(z) = \sum_{i=1}^{L_N} n_i z^{-i+1} = z(N(z) - 1). \quad (5)$$

Next, signal e(z) 66 (FIG. 2E) is defined as $$e(z) = N(z)x(z) + N_e(z)(z^{-1}v(z)) + (1 - D(z))t(z) \quad (6)$$
$$= N(z)x(z) + (N(z) - 1)v(z) + (1 - H(z)N(z))t(z).$$

The modulo operation may be described by $$t(z) = e(z) + v(z) \quad (7)$$

thus, $$e(z) = t(z) - v(z) \quad (8)$$

Substitute equation (8) into (6), results in $$t(z) - v(z) = N(z)x(z) + (N(z) - 1)v(z) + (1 + H(z)N(z))t(z). \quad (9)$$

From equation (9), t(z) is expressed as $$t(z) = \frac{N(z)(x(z) + v(z))}{H(z)N(z)} = \frac{x(z) + v(z)}{H(z)}. \quad (10)$$

At the receiver side, the received signal r(z) is given by $$r(z) = H(z)t(z) = H(z)\frac{x(z) + v(z)}{H(z)} = x(z) + v(z). \quad (11)$$

As in a straightforward application of a TH precoder, the received signal consists of the PAM-M signal x(z) and the compensation signal v(z) of multiple of 2M. Thus, the design in FIG. 2E still keeps the same functionality as a TH precoder. In the presence of additive noise, the received signal becomes $$r(z) = H(z)t(z) + n(z) = H(z)\frac{x(z) + v(z)}{H(z)} + n(z) = x(z) + v(z) + n(z). \quad (12)$$

Thus, the error probability performance is the same as a straightforward implementation.

As illustrated in FIG. 2E, there are mainly two nonlinear feedback loops in the design. One is the pipelined loop containing the FIR filter 1−D(z). The other is the non-pipelined nonlinear loop containing the FIR filter Ne(z). The speed of the design in FIG. 2E is limited by the non-pipelined loop. However, like feedback loops in decision feedback equalizers (DFEs), the compensation signal v(k) 30 in the non-pipelined loop only takes finite number of different values. Thus, all possible outputs of the FIR filter $N_e(z)$ 62 may be pre-computed as in a pre-computation technique for quantizers that is known in the art.

Figure 2F:
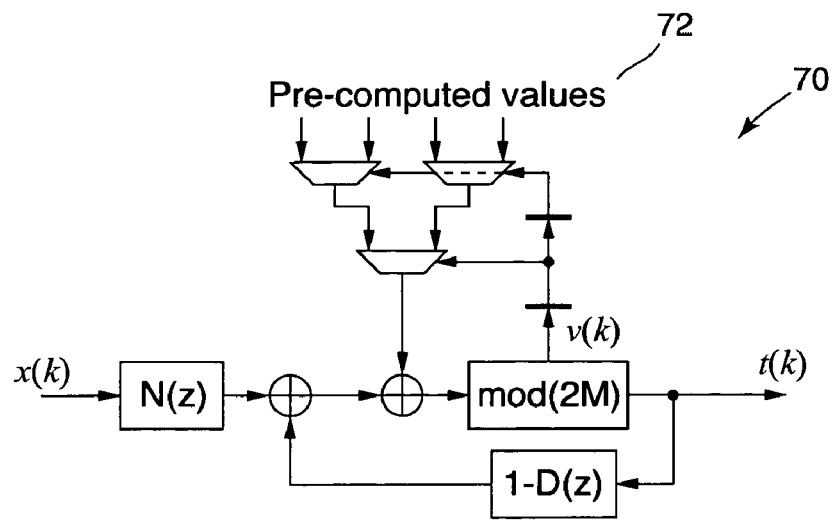

FIG. 2F is a block diagram of an exemplary precoder pipelined architecture 70. $N_e(z)$ 62 (FIG. 2E) was assumed to have only two taps and was therefore replaced by all pre-computed values 72 in TH precoder pipelined architecture 70.

In a first example of a pipelined precoder, a channel transfer function is $H(z) = 1 + h_1 z^{-1} + h_2 z^{-2}$. The transfer function $H_e(z)$ of a zero-forcing pre-equalizer is $$H_e(z)\frac{1}{H(z)} = \frac{1}{1+h_1 z^{-1}+h_2 z^{-2}}. \quad (13)$$

A 2-level scattered look-ahead pipelined design of the IIR filter He(z) may be obtained by multiplying $N(z)=1-h_1 z^{-1}+h_2 z^{-2}$ to the numerator and the denominator of $H_e(z)$ $$H_p(z) = \frac{1-h_1 z^{-1}+h_2 z^{-2}}{1+(2h_2-h_1^2)z^{-2}+h_2^2 z^{-4}} \quad (14)$$

Apply the technique in FIG. 2 to this first example to obtain an exemplary pipelined precoder design.

Figure 3:
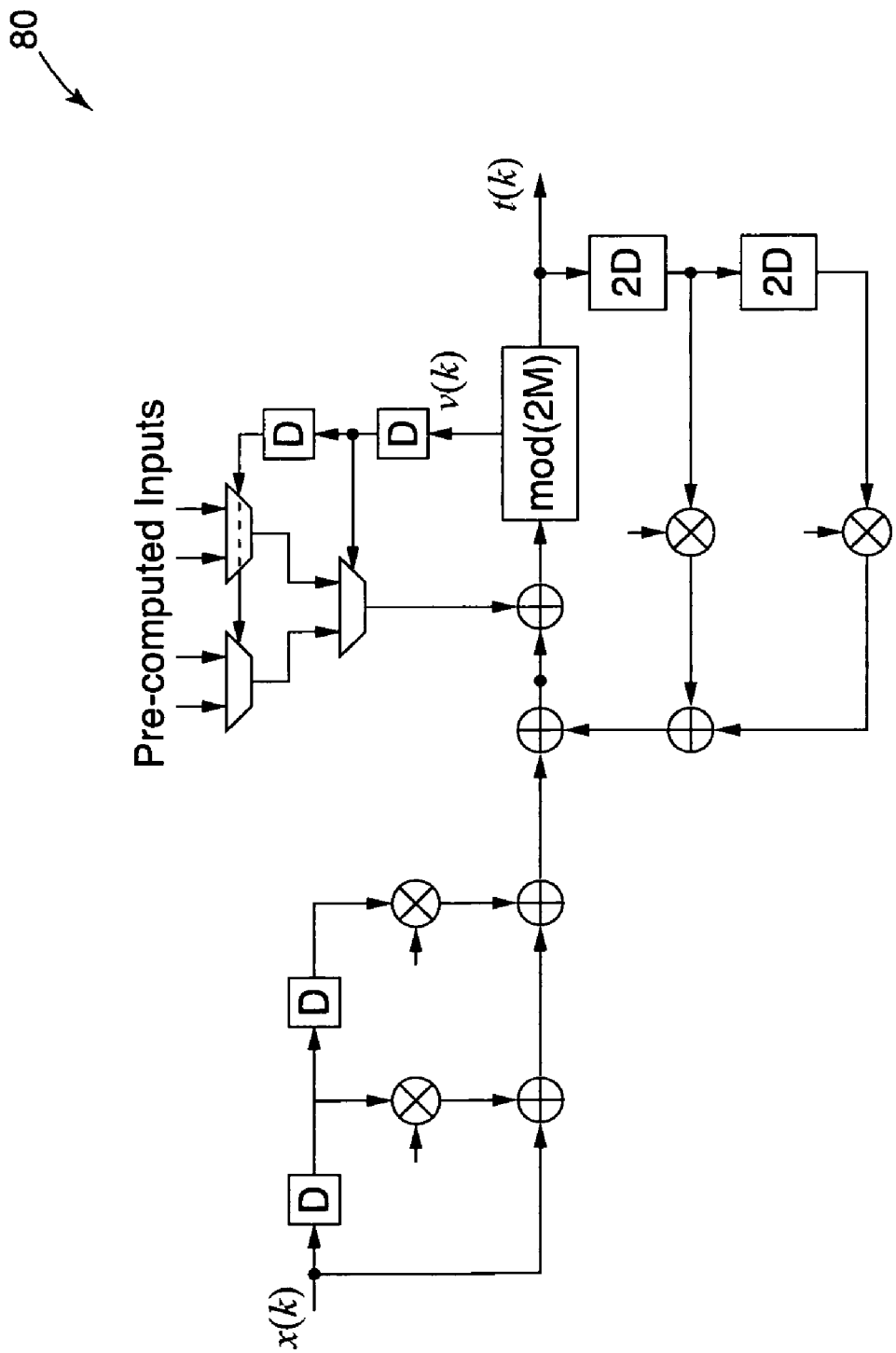
FIG. 3 is a block diagram of a first exemplary pipelined precoder.

FIG. 3 is a block diagram of a first exemplary pipelined precoder 80. The techniques of FIG. 2 were applied to the first example described above resulting in pipelined precoder 80. The iteration bound $T_\infty$ of pipelined precoder 80 is given by $$T_\infty = \max\left\{\frac{3T_a+T_{mod}+T_m}{2}, T_a+T_{mod}+T_{mux}\right\} \quad (15)$$

where $T_{mux}$ is the operation time of a multiplexer. Although described with respect to a multiplexer, other types of selection elements may be used. Assume $T_m$ dominates the computation time, then pipelined precoder 80 may achieve a speedup of 2. In general, for a K-level scattered pipelined design, the iteration bound is given by $$T_\infty = \max\left\{\frac{3T_a+T_{mod}+T_m}{K}, T_a+T_{mod}+T_{mux}\right\}. \quad (16)$$

For a large-enough pipelining level K, the speed is limited by the term $T_a+T_{mod}+T_{mux}$.

In a second example of a pipelined precoder, the iteration bound of pipelined precoder 80 is improved by reformulating the design of pipelined precoder 80.

Figure 4:
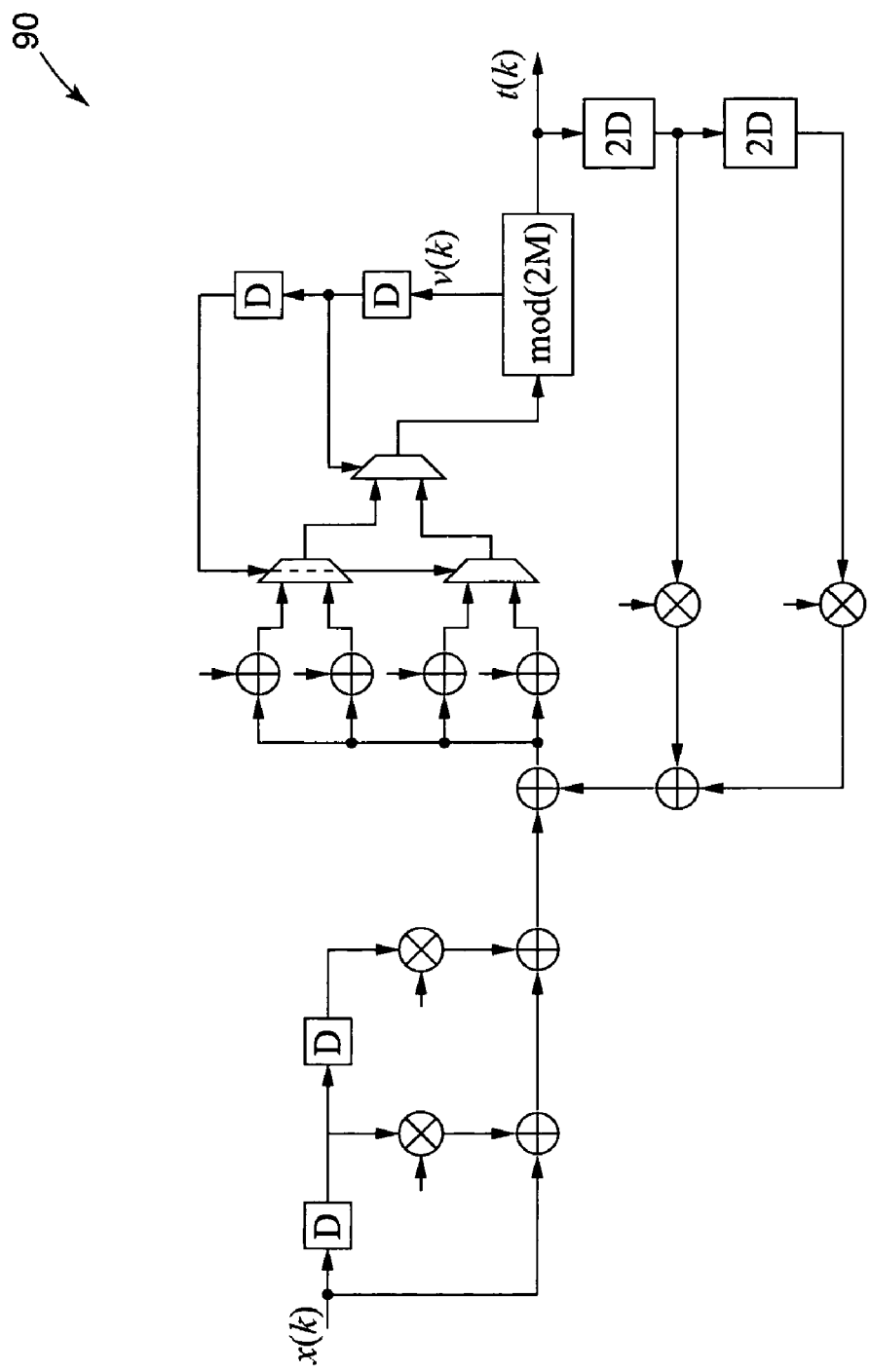
FIG. 4 is a block diagram of a second exemplary pipelined precoder.

FIG. 4 is a block diagram of second exemplary pipelined precoder 90. The iteration bound of pipelined precoder 90 is given by $$T_\infty = \max\left\{\frac{3T_a+T_{mod}+T_m+L_N T_{mux}}{K}, T_{mod}+T_{mux}\right\} \quad (17)$$

For a large K, the speed of pipelined precoder 90 is limited by the term $T_{mod}+T_{mux}$.

For a clustered K-level pipelined design, the iteration bounds in equations (16) and (17) become $$T_\infty = \max_{i=0,1,\ldots L_H-2}\left\{\frac{(3+i)T_a+T_{mod}+T_m}{K+1}, T_a+T_{mod}+T_{mux}\right\} \quad (18)$$

and $$T_\infty = \max_{i=0,1,\ldots L_H-2}\left\{\frac{(3+i)T_a+T_{mod}+T_m+L_N T_{mux}}{K+1}, T_{mod}+T_{mux}\right\} \quad (19)$$

respectively.

One drawback associated with precoder pipelined architecture 70 (FIG. 2F) is the hardware overhead. The overhead due to pre-computation is exponential with the number of taps of the FIR filter $N_e(z)$. When the number of taps is large, the hardware overhead is formidable. To reduce the overhead, $N_e(z)$ may be rewritten into two parts $$N_e(z) = N_{e1}(z) + z^{-(L_{Ne1}-1)}N_{e2}(z) \text{ where} \quad (20)$$

$$N_{e1}(z) = \sum_{i=1}^{L_{Ne1}} n_i z^{-(i-1)} \text{ and } N_{e2}(z) = \sum_{i=L_{Ne1}1}^{L_N} n_i z^{-(i-L_{Ne1})}.$$

Then, the precoder pipelined architecture 70 (FIG. 2F) may be redrawn.

Figure 5:
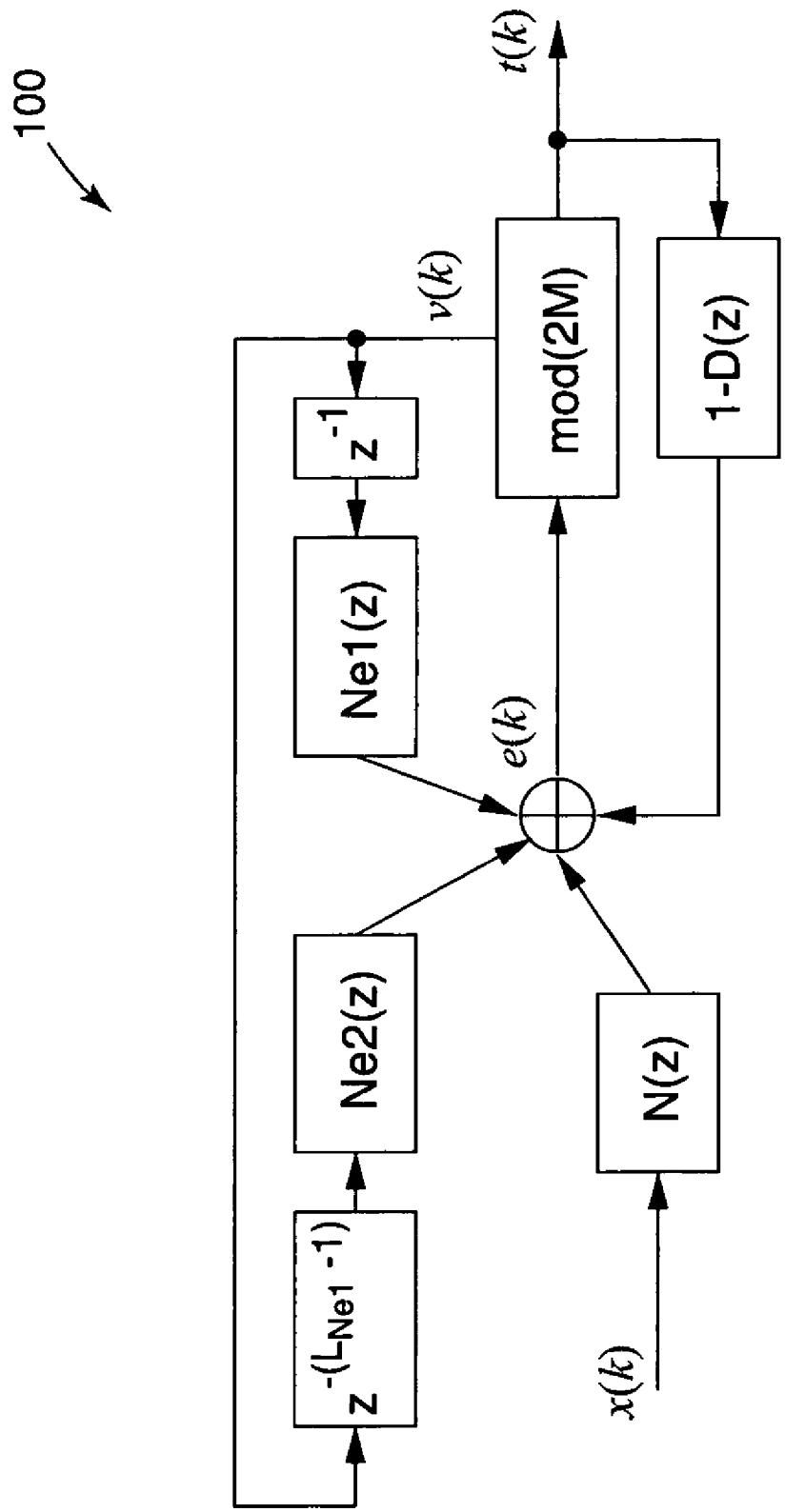
FIG. 5 is a block diagram of an exemplary modified precoder pipelined architecture.

FIG. 5 is a block diagram of an exemplary modified precoder pipelined architecture 100, which utilizes a reduction in hardware in comparison to precoder pipelined architecture 70 (FIG. 2F). For a high speed design, only the output of the FIR filter $N_{e1}(z)$ needs to be pre-computed.

Often, it is more compact to describe a channel with an IIR model $$H(z) = \frac{B(z)}{A(z)} \text{ where} \quad (21)$$

$$A(z) = 1+\sum_{i=1}^{L_A} a_i z^{-i} \text{ and } B(z) = 1+\sum_{i=1}^{L_B} b_i z^{-i}.$$

Utilization of the IIR model may be another method of reducing the hardware complexity. However, the corresponding IIR precoder also suffers from a timing problem. The iteration bound of the precoder is $$T_\infty = 2T_a + T_m. \quad (22)$$

Thus, it is desirable to develop pipelined designs to reduce the iteration bound of IIR precoders.

Figure 6B:
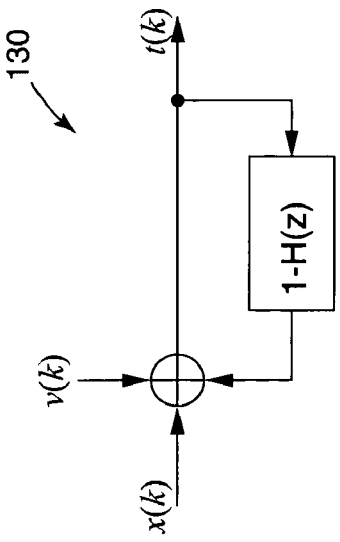
FIGS. 6A-6D are block diagrams illustrating an exemplary process of pipelining a infinite impulse response (IIR) TH precoder.
Figure 6A:
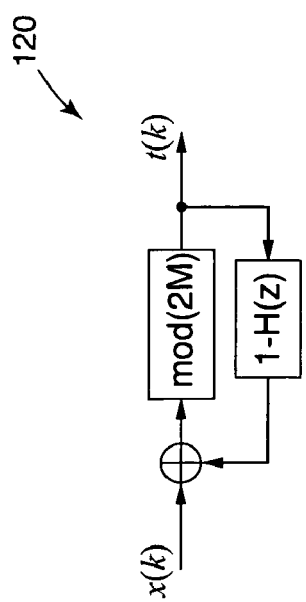

FIGS. 6A-6D are block diagrams illustrating an exemplary process of pipelining a TH IRR precoder. FIG. 6A is a block diagram of an IIR TH precoder 120 with $$H(z) = \frac{B(z)}{A(z)}.$$

FIG. 6B is a block diagram of an equivalent form precoder 130, which is an equivalent form of IRR TH precoder 120.

Figure 6D:
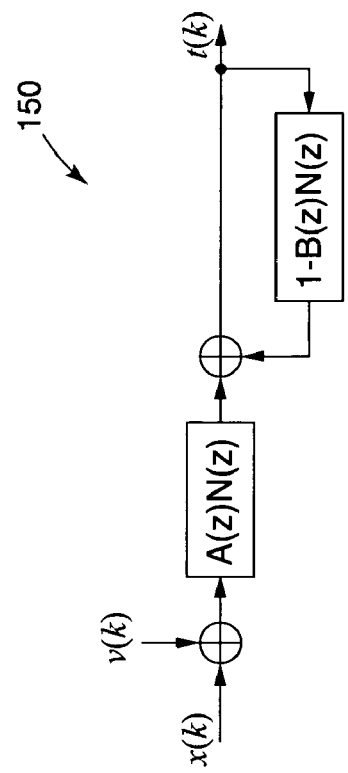
Figure 6C:
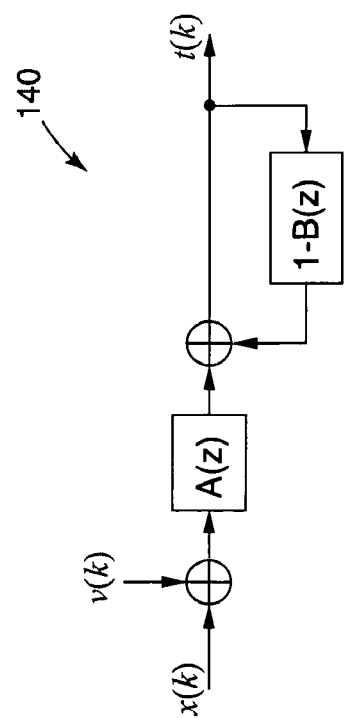

FIG. 6C is a block diagram of an alternative equivalent form precoder 140, which was generated by redrawing equivalent form precoder 130. The speed of the design is limited by the speed of the IIR filter $$\frac{1}{B(z)}.$$

As described above, pipelining techniques, such as the clustered and the scattered look-ahead approaches are applied to remove this bound, resulting in a pipelined equivalent form.

FIG. 6D is a block diagram of a pipelined equivalent form 150, where $$N(z) = \sum_{i=1}^{L_N} n_i z^{-i}$$

is a pipelining polynomial. Then, the same techniques described in FIGS. 2C through 2F may be applied to pipelined equivalent form 150 (FIG. 6D) to pipeline the IIR TH precoder. Additionally, the techniques described in FIG. 5 may be applied to reduce the complexity of the fully pre-computed design. The resulting iteration bounds are the same as those described in FIGS. 3 and 4.

As an alternative to pipelining precoders, a parallel precoder design may be implemented to generate a high-speed precoder. The parallel precoder design may be one of two designs, either a (1) parallel precoder where the parallelism level L is less or equal to the order of the channel, or a (2) parallel precoder where the parallelism level is larger than the order of the channel.

For the parallel precoder design where the parallelism level L is less or equal to the order of the channel, an inter-symbol interference (ISI) channel is $$H(z)=1+h_1z^{-1}+h_2z^{-2}+h_3z^{-3}+h_4z^{-4} \quad (23)$$

and its corresponding pre-equalizer $$t(n)=-h_1t(n-1)-h_2t(n-2)-h_3t(n-3)-h_4t(n-4)+x(n). \quad (24)$$

From equation (24), the 2-stage and 3-stage look ahead equations are derived as $$t(n) = -h_1 t(n-1) - h_2 t(n-2) - h_3 t(n-3) - h_4 t(n-4) + x(n) \quad (25)$$
$$= (h_1^2 - h_2)t(n-2) + (h_1 h_2 - h_3)t(n-3) + (h_1 h_3 - h_4)t(n-4)$$
$$+ h_1 h_4 t(n-5) - h_1 x(n-1) + x(n) \quad (26)$$
$$= (-h_1^3 + 2h_1 h_2 - h_3)t(n-3) + (-h_1^2 h_2 + h_1 h_3 + h_2^2 - h_4)t(n-4) + \quad (27)$$
$$(h_1^2 h_3 + h_1 h_4 + h_2 h_3)t(n-5) + (-h_1^2 h_4 + h_2 h_4)t(n-6) +$$
$$(h_1^2 - h_2)x(n-2) - h_1 x(n-1) + x(n).$$

Substitute n=3k+3, n=3k+4, and n=3k+5 into equations (25), (26), and (27), respectively, and the following three loop update equations are obtained $$t(3k+3) = \quad (28)$$
$$-h_1 t(3k+2) - h_2 t(3k+1) - h_3 t(3k) - h_4 t(3k-1) + x(3k+3)$$
$$t(3k+4) = (h_1^2 - h_2)t(3k+2) + (h_1 h_2 - h_3)t(3k+1) +$$
$$(h_1 h_3 - h_4)t(3k) + h_1 h_4 t(3k-1)$$
$$-h_1 x(3k+3) + x(3k+4) \quad (29)$$
$$t(3k+5) = \quad (30)$$
$$(-h_1^3 + 2h_1 h_2 - h_3)t(3k+2) + (-h_1^2 h_2 + h_1 h_3 + h_2^2 - h_4)t(3k+1) +$$
$$(-h_1^2 h_3 + h_1 h_4 + h_2 h_3)t(3k) + (-h_1^2 h_4 + h_2 h_4)t(3k-1) +$$
$$(h_1^2 - h_2)x(3k+3) - h_1 x(3k+4) + x(3k+5).$$

Figure 7A:
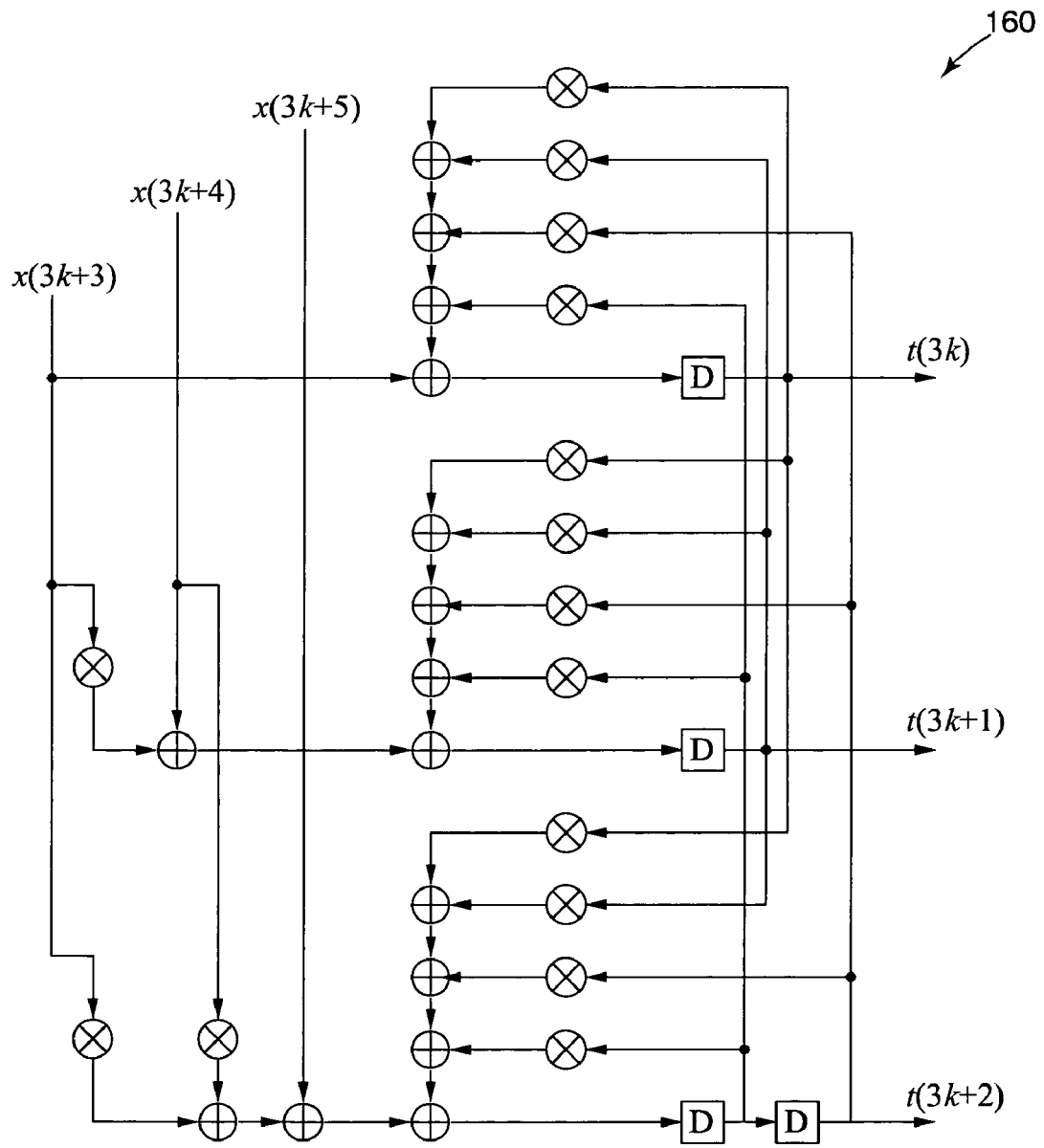
FIG. 7A is a block diagram of an exemplary 3-level parallel IRR filter.

FIG. 7A is a block diagram of an exemplary 3-level parallel IIR filter 160, as described by equations (23)-(30).

Figure 7B:
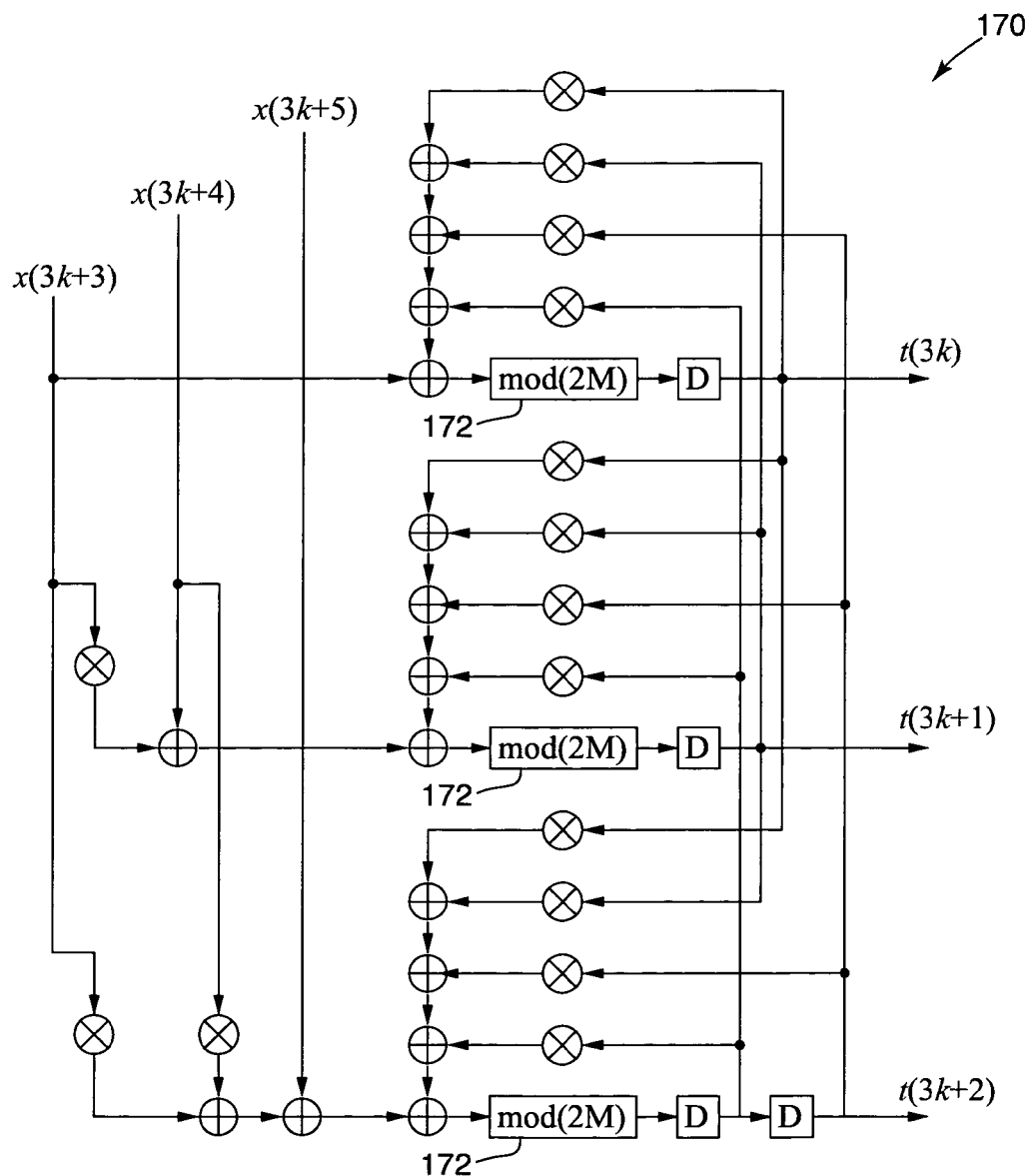
FIG. 7B is a block diagram of an exemplary 3-level parallel TH precoder.

FIG. 7B is a block diagram of an exemplary 3-level parallel TH precoder 170, which was generated by introducing modulo devices 172 into the output paths of 3-level parallel IIR filter 160 (FIG. 7A). Modulo devices 172 limit the dynamic range of the outputs of parallel IIR filter 160 (FIG. 7A).

Figure 7C:
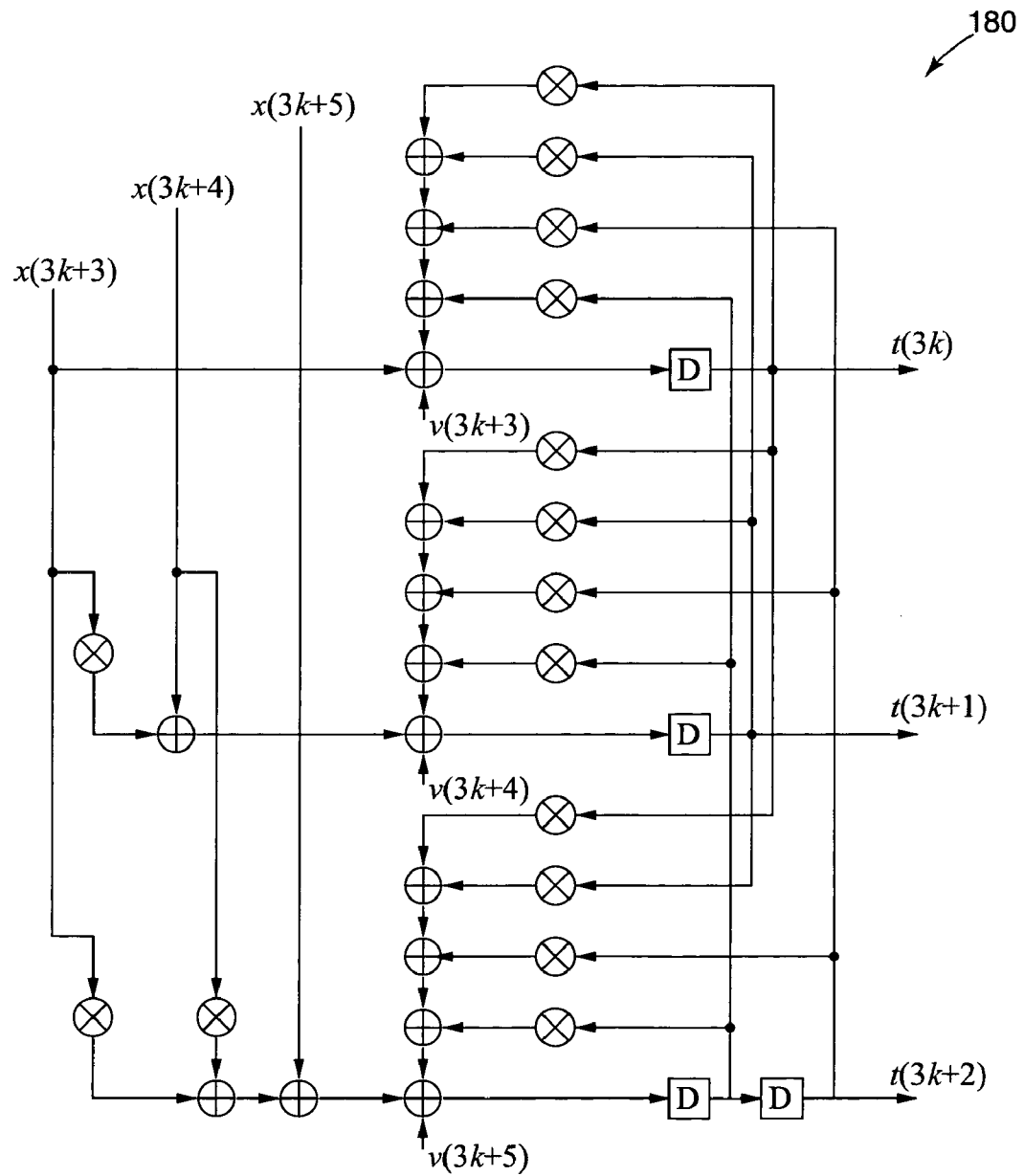
FIG. 7C is a block diagram of an exemplary equivalent form 3-level parallel TH precoder.

FIG. 7C is a block diagram of an exemplary equivalent form parallel TH precoder 180, which is equivalent to the 3-level parallel TH precoder 170 (FIG. 7B). The outputs of equivalent form parallel TH precoder 180, as illustrated in FIG. 7C, are $$t(3k+3) = -h_1 t(3k+2) - h_2 t(3k+1) - \quad (31)$$
$$h_3 t(3k) - h_4 t(3k-1) + x(3k+3) + v(3k+3)$$
$$t(3k+4) = \quad (32)$$
$$(h_1^2 - h_2)t(3k+2) + (h_1 h_2 - h_3)t(3k+1) + (h_1 h_3 - h_4)t(3k) +$$
$$h_1 h_4 t(3k-1) - h_1 x(3k+3) + x(3k+4) + v(3k+4)$$
$$t(3k+5) = \quad (33)$$
$$(-h_1^3 + h_1 h_2 - h_3)t(3k+2) + (-h_1^2 h_2 - h_1 h_3 + h_2^2 - h_4)t(3k+1) +$$
$$(-h_1^2 h_3 + h_1 h_4 + h_2 h_4)t(3k) + (-h_1^2 h_4 + h_2 h_4)t(3k-1).$$

From equations (24), (31), (32), and (33), the received signals at time n=3k, n=3k+1, n 3k+2, are $$r(3k)=x(3k)+v(3k) \quad (34)$$

$$r(3k+1)=x(3k+1)+v(3k+1)+h_1 v(3k) \quad (35)$$

$$r(3k+2)=x(3k+1)+v(3k+2)+h_1 v(3k+1)+h_2 v(3k). \quad (36)$$

In the presence of additive noise, the received signals become $$r(3k)=x(3k+3)+v(3k+3)+n(3k+3) \quad (37)$$

$$r(3k+1)=x(3k+1)+v(3k+1)+h_1 v(3k)+n(3k+1) \quad (38)$$

$$r(3k+2)=x(3k+2)+v(3k+2)+h_1 v(3k+1)+h_2 v(3k+1)+n(3k+2) \quad (39)$$

Figure 8B:
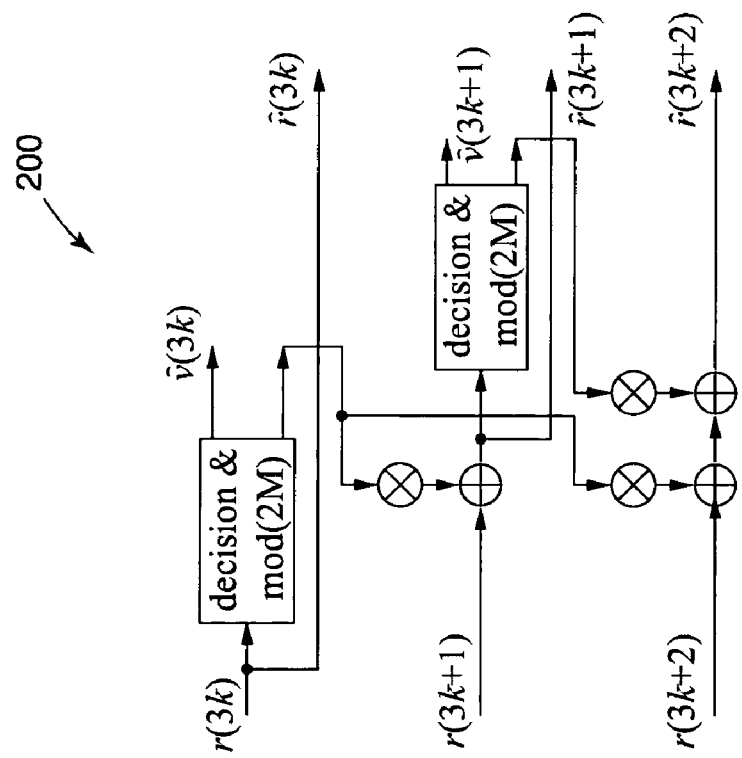
FIGS. 8A and 8B are block diagrams of exemplary parallel TH precoder designs.
Figure 8A:
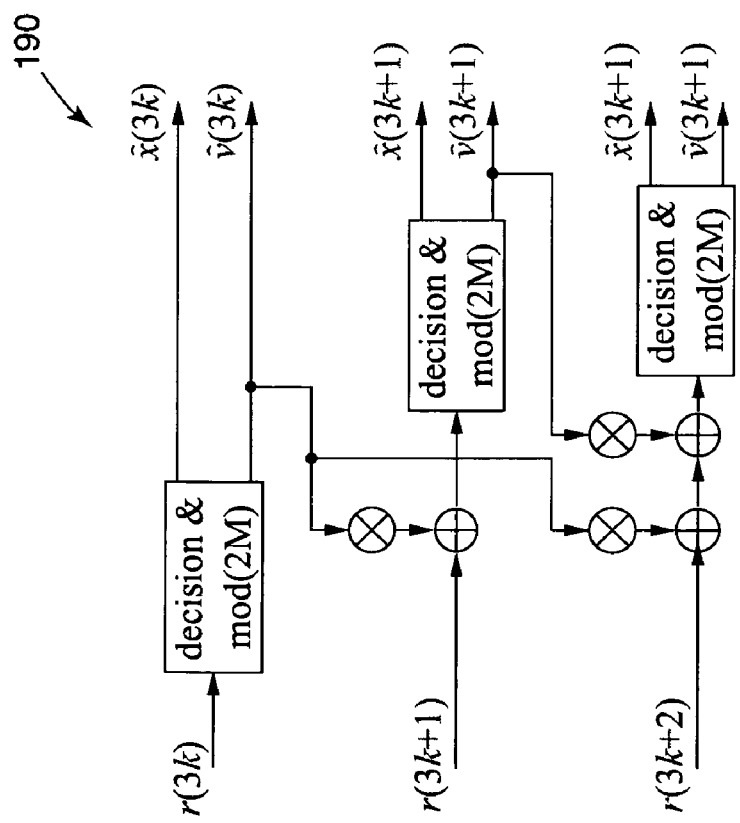

FIGS. 8A and 8B are block diagrams of exemplary parallel TH precoder designs 190 and 200. Both precoder designs 190 and 200 recover x(3k+i), i=0, 1, 2 from r(3k+i), i=0, 1, 2. The architecture in precoder design 200 (FIG. 8B) is more suitable for applications where x(3k+i), i=0, 1, 2 are coded.

The error probability of $$\hat{x}(3k+3) \text{ is } f\left(\frac{S_x}{S_n}\right)$$

where f is the error probability function for PAM-M modulation. For $\hat{x}(3k+4)$, there are two causes for a decision error. One is due to the noise n(3k+4), and the corresponding error rate is $$f\left(\frac{S_x}{S_n}\right).$$

The other is due to the decision error on $\hat{v}(3k+3)$. Since the minimum distance between different levels of the compensation signal is M times that between the transmitted symbols x, the error rate of v(3k+3) may be roughly calculated as $$f\left(\frac{M^2 S_x}{S_n}\right).$$

Thus, the error due to n(3k+4) dominates. Furthermore, the error rate of x̂(3k+4) may be approximated by $$f\left(\frac{S_x}{S_n}\right).$$

Similarly, for a large enough M, the error rate of x̂(3k+5) may be approximated by $$f\left(\frac{S_x}{S_n}\right).$$

Hence, the performance of the parallel precoder is close to that of a straightforward TH precoder.

For the parallel precoder design where the parallelism level L is larger than the order of the channel, a second order ISI channel is $$H(z) = 1 + h_1 z^{-1} + h_2 z^{-2} \tag{40}$$

and its corresponding zero-forcing pre-equalizer is $$t(n) = -h_1 t(n-1) - h_2 t(n2) + x(n). \tag{41}$$

Its 2-stage, 3-stage, and 4-stage look-ahead equations may be derived as $$t(n) = -h_1 t(n-1) - h_2 t(n-2) + x(n) \tag{42}$$

$$= (h_1^2 - h_2)t(n-2) + h_1 h_2 t(n-3) - h_1 x(n-1) + x(n) \tag{43}$$

$$= (2h_1 h_2 - h_1^3)t(n-3) + (h_2^2 - h_2 h_1^2)t(n-4)$$

$$+ (h_1^2 - h_2)x(n-2) - h_1 x(n-1) + x(n) \tag{44}$$

$$= (h_1^4 - 3h_1^2 h_2 + h_2^2)t(n-4) + (h_1^3 h_2 - 2h_1 h_2^2)t(n-5) + \tag{45}$$

$$(2h_1 h_2 - h_1^3)x(n-3) + (h_1^2 - h_2)x(n-2) - h_1 x(n-1) + x(n)$$

Substituting n=4k+4 and n=4k+5 into equations (44) and (45), results in the following loop update equations $$t(4k+4) = (2h_1 h_2 - h_1^3)t(4k+1) + (h_2^2 - h_2 h_1^2)t(4k) + \tag{46}$$

$$(h_1^2 - h_2)x(4k+2) - h_1 x(4k+3) + x(4k+4)$$

$$t(4k+5) = (h_1^4 - 3h_1^2 h_2 + h_2^2)t(4k+1) + \tag{47}$$

$$(h_1^3 h_2 - 2h_1 h_2^2)t(4k) + (2h_1 h_2 - h_1^3)x(4k+2) +$$

$$(h_1^2 - h_2)x(4k+3) - h_1 x(4k+4) + x(4k+5)$$

The outputs t(4k+2) and t(4k+3) are computed incrementally as follows $$t(4k+2) = -h_1 t(4k+1) - h_2 t(4k) + x(4k+2) \tag{48}$$

$$t(4k+3) = -h_1 t(4k+2) - h_2 t(4k+1) + x(4k+3) \tag{49}$$

Figure 9:
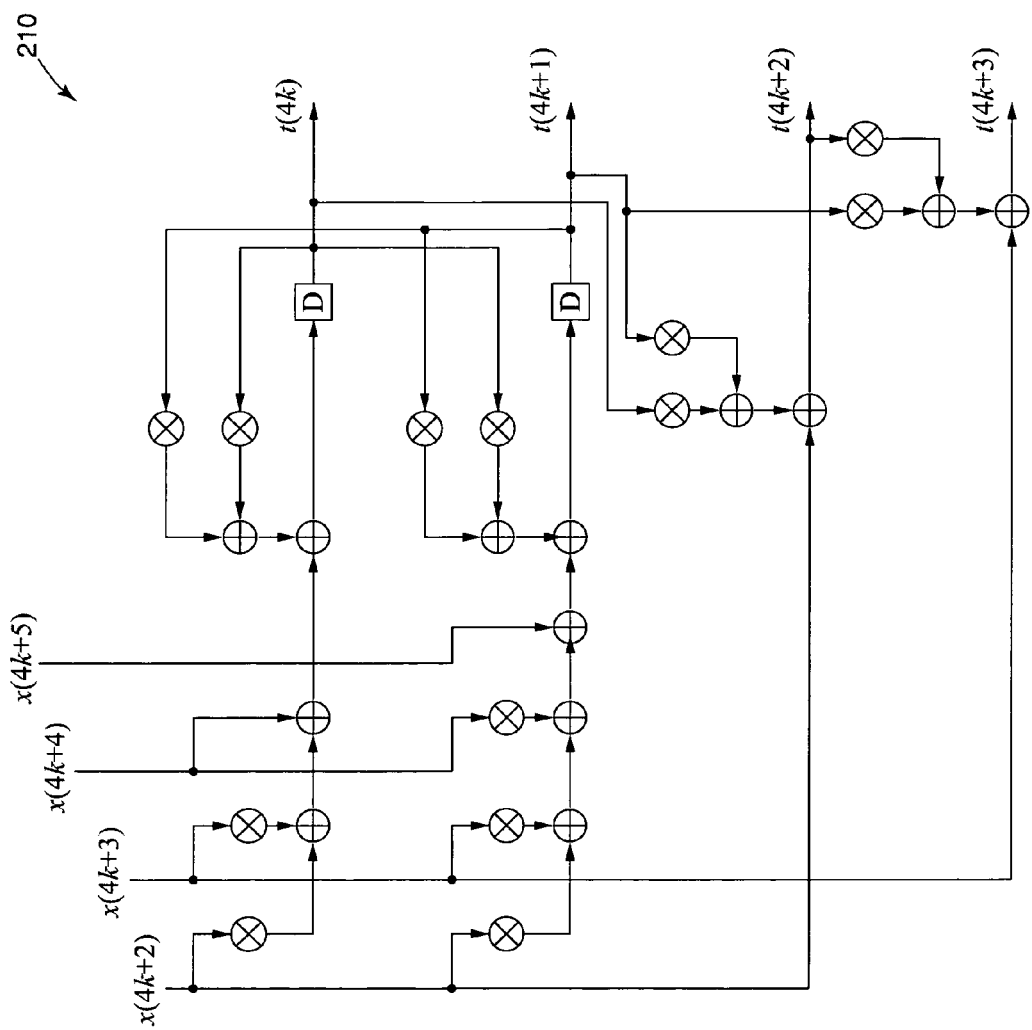
FIG. 9 is a block diagram of an exemplary architecture of a parallel IIR filter.

FIG. 9 is a block diagram of an exemplary architecture of a parallel IIR filter 210, corresponding with equations (40)-(49).

Figure 10:
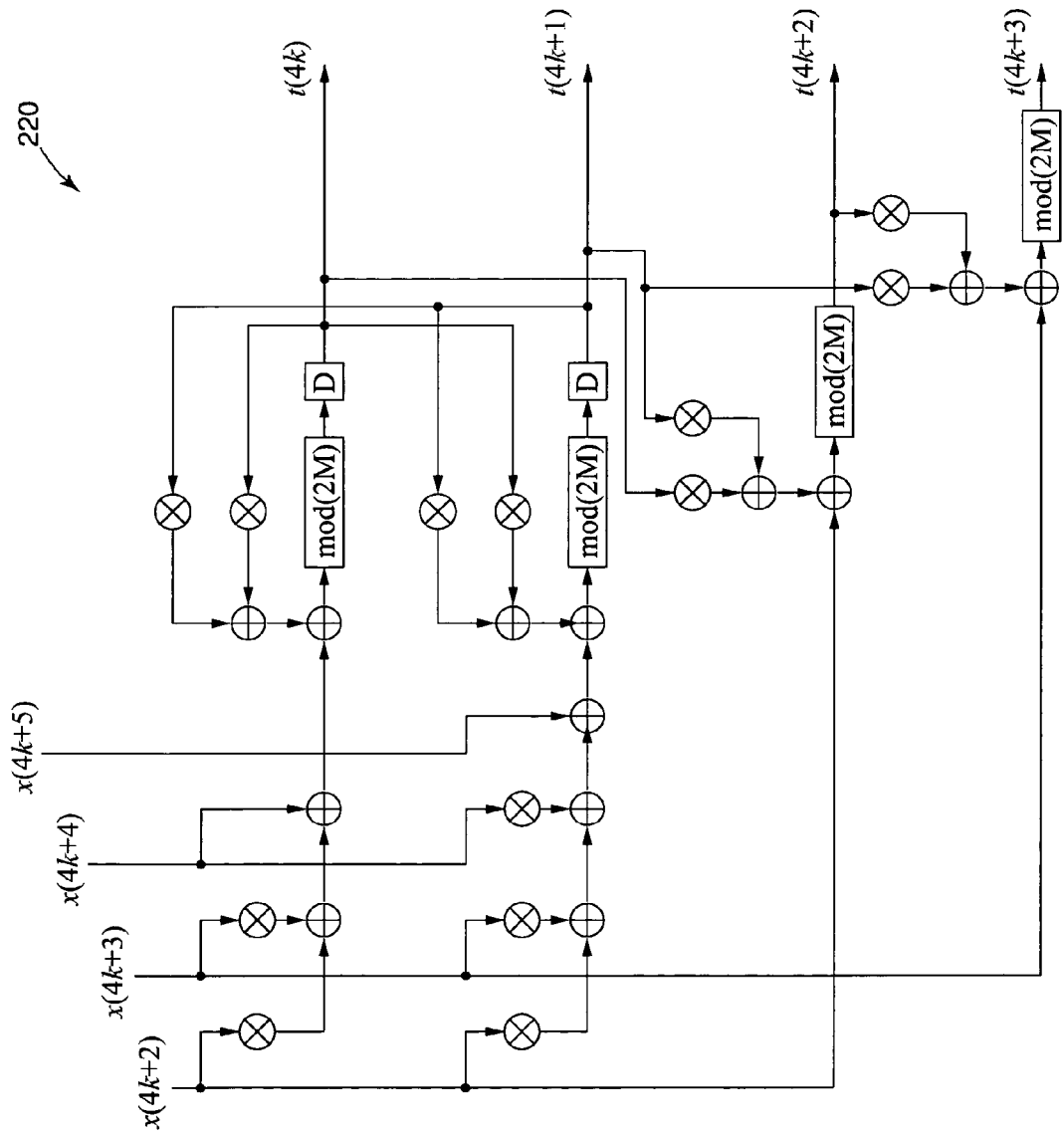
FIGS. 10 and 11 are block diagrams of exemplary TH precoder architectures corresponding with the parallel IRR filter of FIG. 9.
Figure 11:
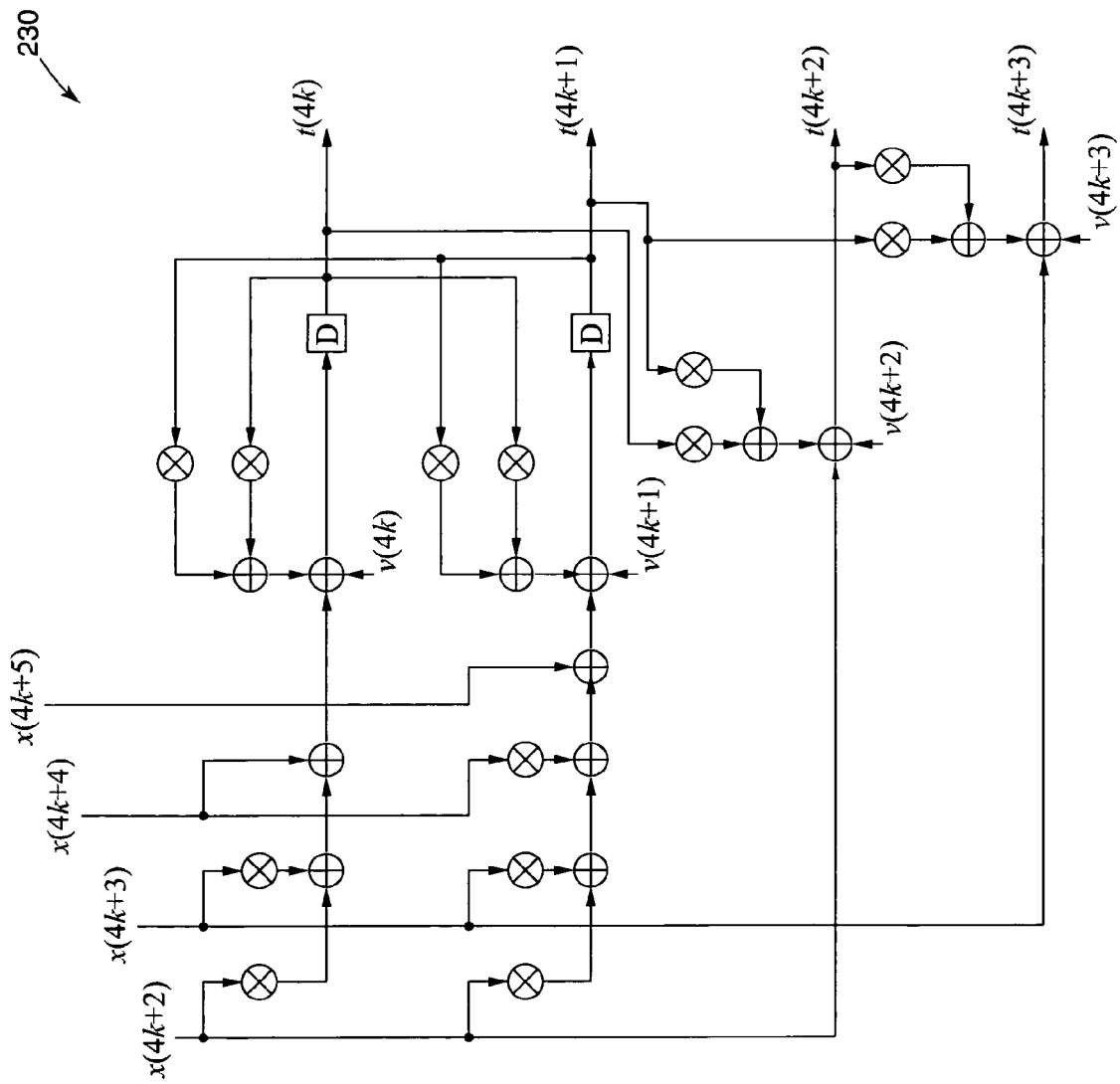

FIGS. 10 and 11 are block diagrams of exemplary TH precoder architectures corresponding with the parallel IRR filter 210. TH precoder architectures 220 (FIG. 10) and 230 (FIG. 11) limit the output of the zero-forcing pre-equalizer. TH precoder architecture 230 is an equivalent form of TH precoder architecture 220.

The outputs of TH precoder architecture 220 are $$t(4k+2) = -h_1 t(4k+1) - h_2 t(4k) + x(4k+2) + v(4k+2) \tag{50}$$

$$t(4k+3) = -h_1 t(4k+2) - h_2 t(4k+1) + x(4k+3) + v(4k+3) \tag{51}$$

$$t(4k+4) = (2h_1 h_2 - h_1^3)t(4k+1) + (h_2^2 - h_2 h_1^2)t(4k) + \tag{52}$$

$$(h_1^2 - h_2)x(4k+2) - h_1 x(4k+3) + x(4k+4) + v(4k+4)$$

$$t(4k+5) = (h_1^4 - 3h_1^2 h_2 + h_2^2)t(4k+1) + \tag{53}$$

$$(h_1^3 h_2 - 2h_1 h_2^2)t(4k) + (2h_1 h_2 - h_1^3)x(4k+2) +$$

$$(h_1^2 - h_2)x(4k+3) - h_1 x(4k+4) + x(4k+5) + v(4k+5)$$

At the receiver side, the received signals are derived as:

$$r(4k+2) = x(4k+2) + v(4k+2) \tag{54}$$

$$r(4k+3) = x(4k+3) + v(4k+3) \tag{55}$$

$$r(4k+4) = x(4k+4) + v(4k+4) + h_1 v(4k+3) + h_2 v(4k+2) \tag{56}$$

$$r(4k+5) = x(4k+5) + v(4k+5) + h_1 v(4k+4) + h_2 v(4k+3) - h_1 h_2 v(4k+2) \tag{57}$$

In the presence of additive noise, the received signals become $$r(4k+2) = x(4k+2) + v(4k+2) + n(4k+2) \tag{58}$$

$$r(4k+3) = x(4k+3) + v(4k+3) + n(4k+3) \tag{59}$$

$$r(4k+4) = \tag{60}$$

$$x(4k+4) + v(4k+4) + h_1 v(4k+3) + h_2 v(4k+2) + n(4k+4)$$

$$r(4k+5) = x(4k+5) + v(4k+5) + \tag{61}$$

$$h_1 v(4k+4) + h_2 v(4k+3) - h_1 h_2 v(4k+2) + n(4k+5)$$

respectively.

Figure 12:
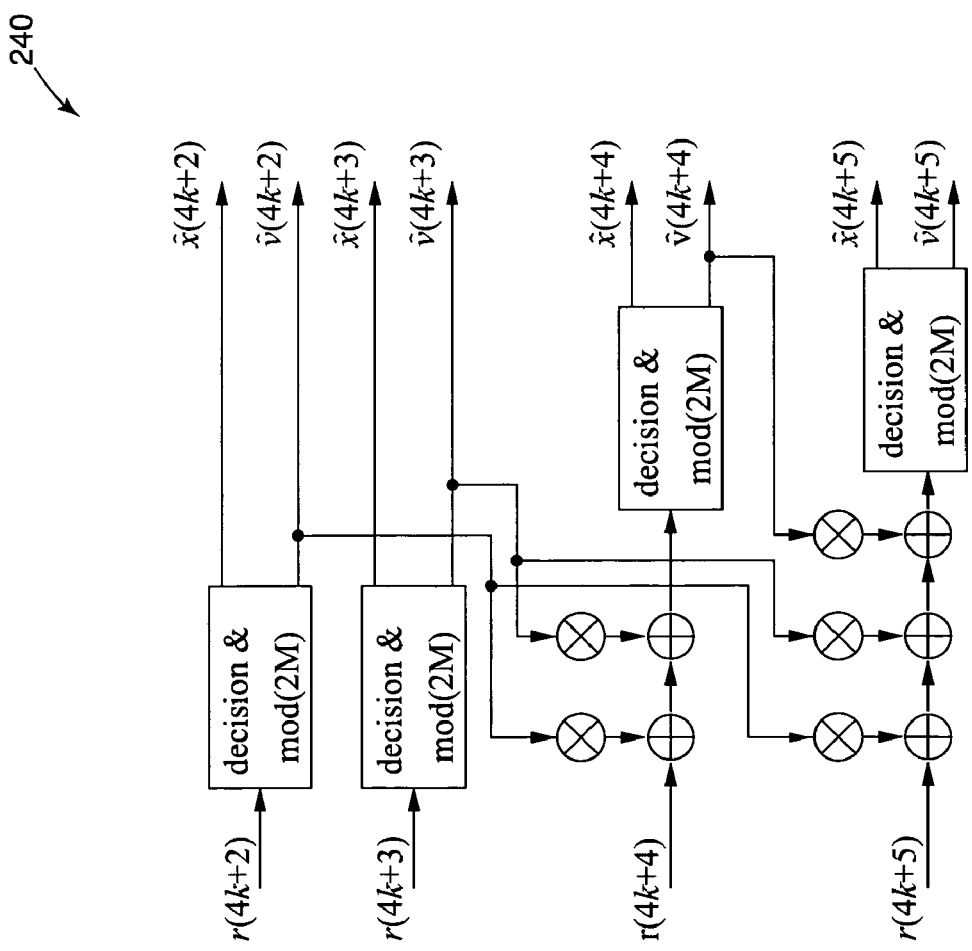
FIGS. 12 and 13 are block diagrams of exemplary receiver architectures with parallel precoders.
Figure 13:
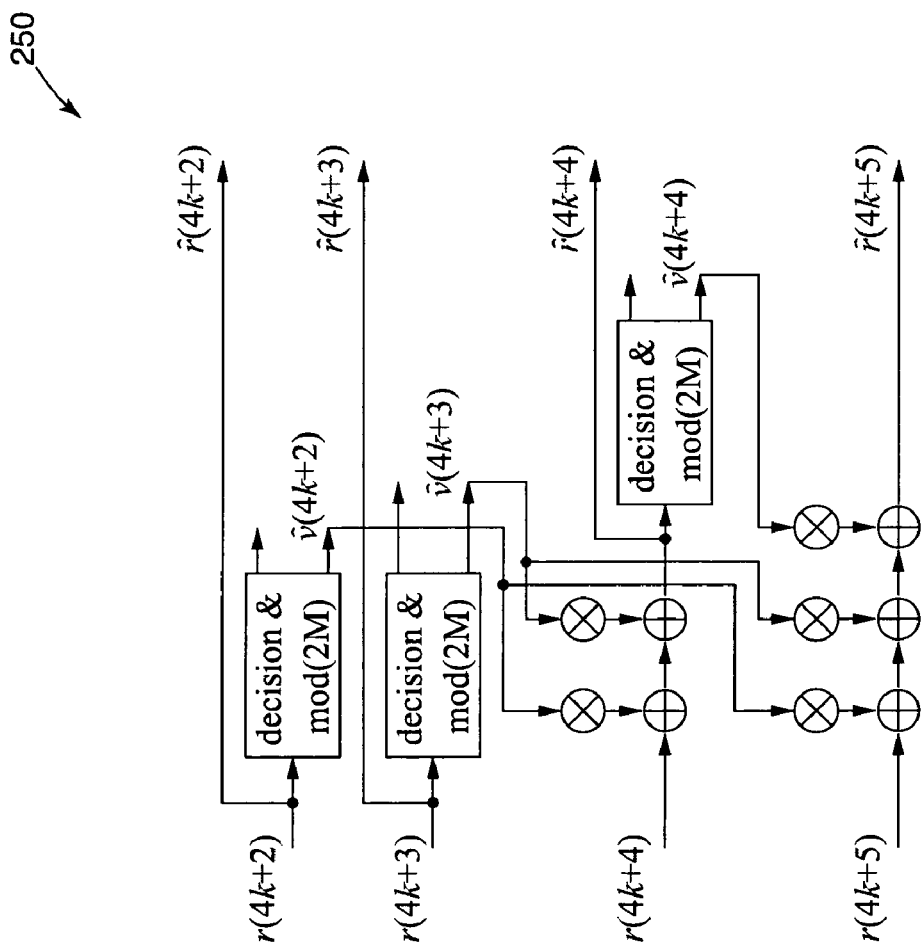

FIGS. 12 and 13 are block diagrams of exemplary receiver architectures with parallel precoders. Both receiver architecture 240 (FIG. 12) and receiver architecture 250 (FIG. 13) recover x(4k+i), i=0, 1, 2, 3 from r(4k+i), i=0, 1, 2, 3. Receiver architecture 250 is more suitable for applications where x(4k+i), i=0, 1, 2, 3 are coded.

The error probability of x̂(4k+2) and $$\hat{x}(4k+3) \text{ is } f\left(\frac{S_x}{S_n}\right).$$

The error probability of x̂(4k+4) and x̂(4k+5) may also be approximated by $$f\left(\frac{S_x}{S_n}\right).$$

Hence, the performance of the parallel precoder is close to that of a straightforward TH precoder.

Various embodiments of the invention have been described. These and other embodiments are within the scope of the following claims.

The invention claimed is:

1. A precoder, comprising:
   a modulo device to output precoded symbols and a compensation signal having N possible values;
   a first pipelined finite impulse response (FIR) filter to receive an input signal and to provide an output to the modulo device;
   a first filter loop, including an FIR filter, a first delay element, and the modulo device, to receive the compensation signal and at least N precomputed values corresponding to the FIR filter, and to provide an output to the modulo device; and
   a second filter loop, including a second pipelined FIR filter, a second delay element, and the modulo device, to receive the precoded symbols and to provide an output to the modulo device.

2. The precoder of claim 1, wherein the first filter loop includes a multiplexer to select one of the at least N precomputed values in response to the compensation signal and to output the selected precomputed value to the modulo device.

3. The precoder of claim 1, wherein:
   the first filter loop includes an inner filter loop associated with a corresponding set of one or more filter taps, and an outer filter loop associated with a corresponding set of one or more filter taps, the inner filter loop and the outer filter loop each to provide a corresponding output to the modulo device; and
   the inner filter loop is configured to receive the at least N precomputed values and to selectively output one of the N precomputed values in response to the compensation signal.

4. The precoder of claim 3, wherein the inner filter loop includes the multiplexer to select the one of the N pre-computed values in response to the compensation signal and to output the selected precomputed value to the modulo device.

5. The precoder of claim 1, wherein the precoder comprises a Tomlinson-Harashima precoder.

6. The precoder of claim 1, wherein the second filter loop is configured as a scattered look-ahead pipelined IIR filter.

7. The precoder of claim 1, wherein the second filter loop is configured as a clustered look-ahead pipelined IIR filter.

8. A parallel Tomlinson-Harashima precoder, comprising:
   N modulo devices to perform N modulo operations in parallel and to output N precoded symbols in parallel, wherein N is a positive integer greater than one;
   wherein at least one of the N modulo devices is configured to receive a sum of one of a plurality of input signals and a first set of scaled versions of j previously precoded symbols, wherein j is a positive integer greater than one; and
   wherein at least one of the N modulo devices is configured to receive a sum of the plurality of the input signals, including a scaled version of one or more of the input signals and a second set of scaled versions of j previously precoded symbols.

9. The parallel Tomlinson-Harashima precoder of claim 8, wherein j is greater than N, and wherein:
   a first one of the N modulo devices is configured to receive a sum of a first one of the input signals and the first set of scaled versions of j previously precoded symbols; and
   one or more remaining ones of the N modulo devices are each configured to receive a corresponding sum of the plurality of the input signals, including a scaled version of one or more of the input signals and a corresponding set of scaled versions of j previously precoded symbols.

10. The parallel Tomlinson-Harashima precoder of claim 8, wherein j is not greater than N, and wherein:
    each of a first subset of the N modulo devices is configured to receive a corresponding sum of the plurality of input signals, including a scaled version of one or more of the input signals and a corresponding set of scaled versions of j previously precoded symbols; and
    each modulo device of a second subset of the N modulo devices is configured to receive a sum of a corresponding one of the input signals and a corresponding set of scaled versions of j previously precoded symbols.

11. A receiver, comprising:
    N modulo devices to decode K precoded symbols in parallel, wherein N and K are positive integers greater than one, wherein the N modulo devices include,
    a first modulo device to decode a first one of the K symbols and to generate a first compensation signal, and
    a second modulo device to decode a second one of the K precoded symbols from a sum of the second K precoded symbol and a scaled version of the first compensation signal.

12. The receiver of claim 11, wherein K is not greater than N.

13. The receiver of claim 11, wherein K is greater than N, wherein the second modulo device is configured to generate a second compensation signal, and wherein the receiver is configured to decode a $K^{th}$ one of the symbols as a sum of the $K^{th}$ symbol and scaled versions of the first through (K−1) compensation signals.

* * * * *